United States Patent [19]

Moreschi

[11] Patent Number: 4,865,240

[45] Date of Patent: Sep. 12, 1989

[54] LAWN TOOL CARRIER

[76] Inventor: Arlene P. Moreschi, 183 Northfield Rd., Meriden, Conn. 06450

[21] Appl. No.: 926,082

[22] Filed: Nov. 3, 1986

[51] Int. Cl.⁴ .............................................. B60R 11/06
[52] U.S. Cl. ..................................... 224/273; 224/232
[58] Field of Search ............... 224/30 A, 41, 273, 232, 224/904, 911, 39; 16/111 A; 280/289 A, 289 H, 47.31, 769; 248/211, 218.4, 219.1, 219.3, 225.31, 231, 231.7, 231.8

[56] References Cited

U.S. PATENT DOCUMENTS

| 581,568 | 4/1897 | Wilde | 224/30 A X |
|---|---|---|---|
| 605,543 | 6/1898 | Fredson | 224/41 X |
| 1,969,258 | 8/1934 | Cross | 224/911 |
| 2,226,251 | 12/1940 | Mayer | 248/231 |
| 2,326,739 | 8/1943 | Andrews | 224/273 X |
| 2,636,747 | 4/1953 | Blackmond | 280/47.31 X |
| 3,119,533 | 1/1964 | Kimes et al. | 224/274 |
| 3,380,698 | 4/1968 | Goldberg et al. | 224/30 A X |
| 3,516,585 | 6/1970 | Inwood | 224/904 X |
| 3,734,439 | 5/1973 | Wintz | 248/225.31 X |
| 4,138,055 | 2/1979 | Harrison | 248/231 X |
| 4,307,825 | 12/1981 | Pattermann | 224/232 X |
| 4,354,650 | 10/1982 | Lowder | 16/111 A X |
| 4,410,115 | 10/1983 | McClain, Jr. et al. | 224/39 |
| 4,596,347 | 6/1986 | Hite | 224/273 X |

FOREIGN PATENT DOCUMENTS 989085   5/1949   France ................................. 224/41

Primary Examiner—Renee S. Luebke
Attorney, Agent, or Firm—Richard A. Craig

[57] ABSTRACT

A carrier for carrying hand tools is attachable to an inclined tubular member of the handle assembly of a lawn mower or other mobile lawn and garden appliance. The carrier comprises a sheath member of rigid or semi-rigid material having an open end to receive a hand tool, a solid closed end and a body portion therebetween. Intermediate the open and closed ends, the sheath member has an external groove therearound. The carrier further includes a metal band seated in the groove and a clamping member attached to the metal band and having confronting jaws for clamping engagement with the tubular member with the closed end lower than the open end.

7 Claims, 2 Drawing Sheets

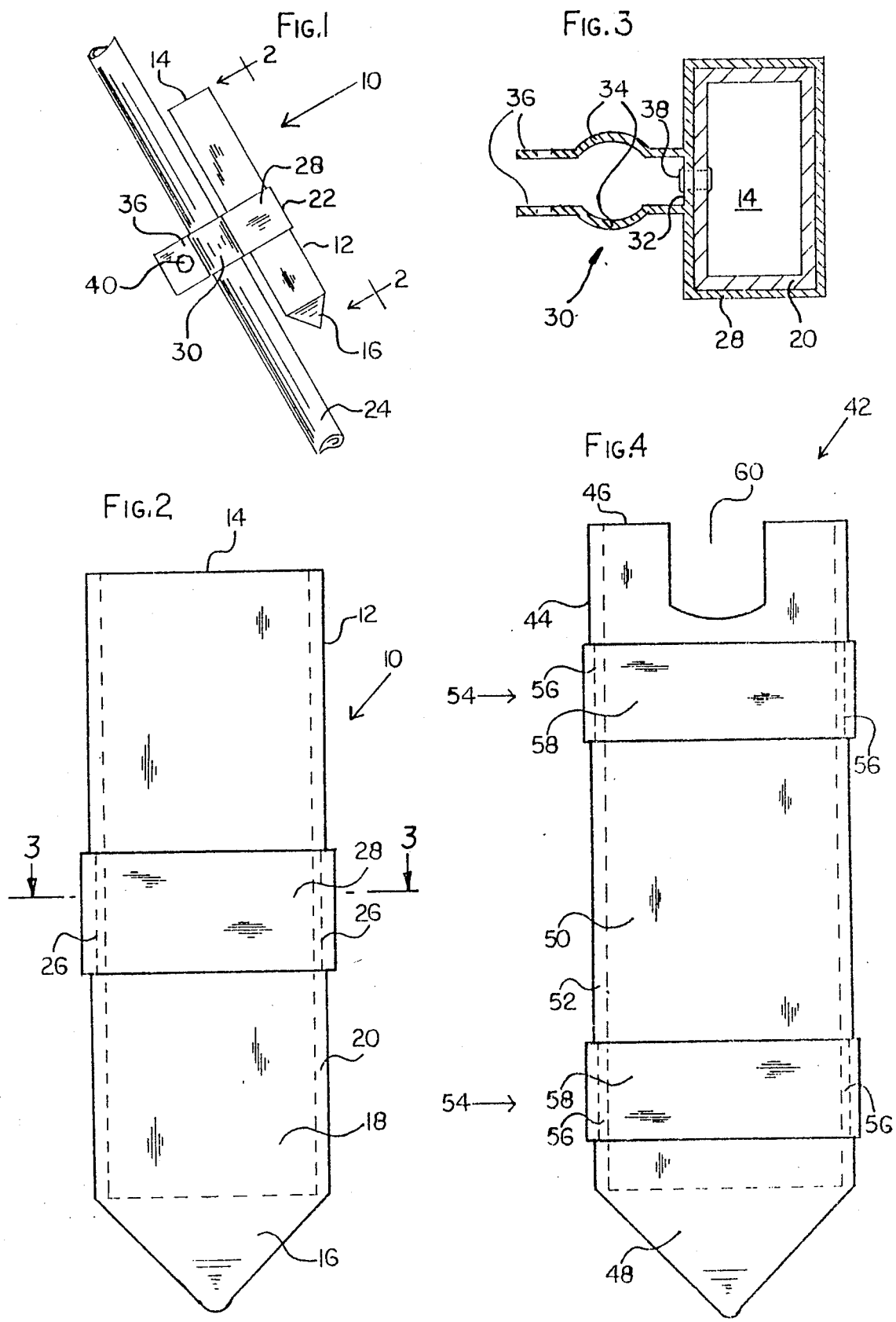

Fig.5
Fig.6
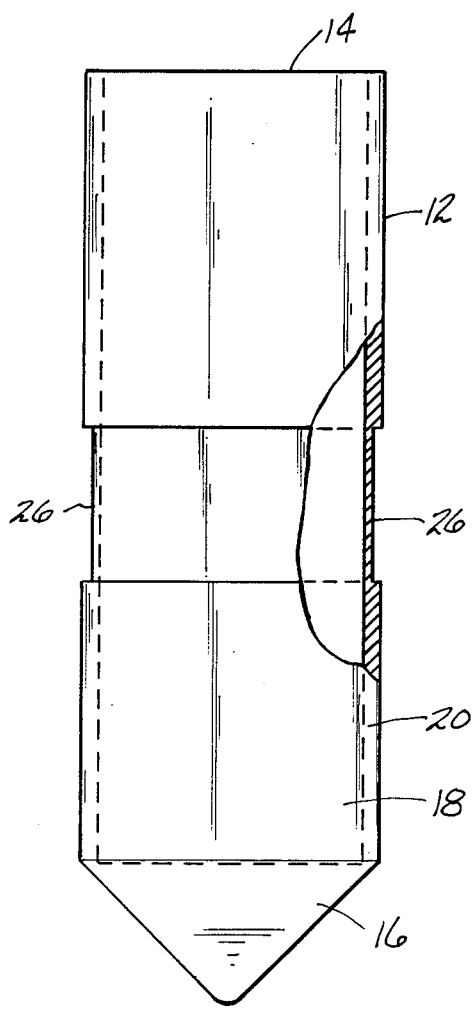
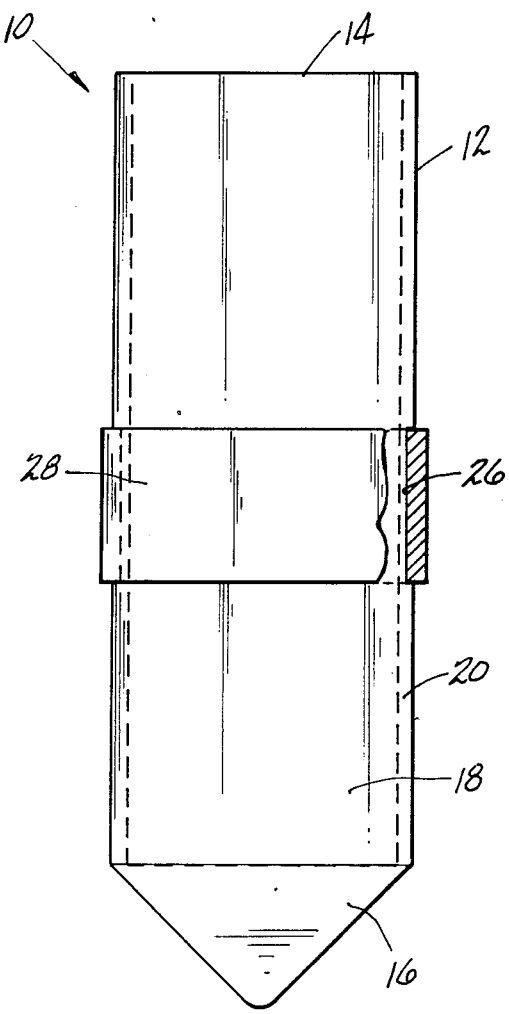

LAWN TOOL CARRIER

BACKGROUND OF THE INVENTION

This invention relates to lawn tool carriers and more particularly to a lawn tool carrier or caddie that may be affixed to an inclined member of the handle assembly of a lawn mower, an upright member of the assembly for carrying edged hand tools, such as pruning shears, edgers and weeders during the mowing operation.

Often, while mowing, the mower notices a need for a particular hand tool. Heretofore, it has been common practice for the mower to interrupt the mowing operation, go to the garage or other area where hand tools may be stored, select the desired tool, return with the tool to the area where the mowing operation was interrupted, use the tool, return the tool to the storage area, go back to the area where the mowing operation was interrupted and resume mowing. This is inconvenient as well as time consuming, and sometimes, after use, the tool is simply dropped on the ground and the mowing operation resumed, a not unusual procedure that may result in not being able to find the tool later on. Furthermore, the dropped tool may be forgotten, or not found, or ruined by rain, or run over by the mower, endangering life and limb.

It is therefore an important object of the invention to provide a lawn tool carrier that is attachable to an inclined member of the handle assembly of a lawn mower and can be used to carry edged hand tools safely and conveniently, ready for use at any time during the mowing operation.

It is a further object to provide such a carrier that is of simple, economical construction, and that is easily attached to an inclined member of the handle assembly of a lawn mower.

It is an additional object to provide such a carrier that could alternatively be attached to another mobile lawn and garden appliance such as a spreader.

Other objects and advantages will appear hereinafter.

The reader may be interested in perusing the following prior U.S. patents that were found in a search hereon:

| U.S. Pat. No. | Date | Inventor |
| --- | --- | --- |
| 2,079,851 | May 11, 1937 | Glenny |
| 3,142,853 | August 4, 1964 | Hensley |
| 3,307,710 | March 7, 1912 | Negri |
| 3,598,295 | August 10, 1969 | Seegers |

These prior patents disclose a bicycle basket, a brush attachment for a golf cart for cleaning golf shoes, a bracket for drip drying wet clothes over a bath tub and a bracket for holding a radio on a bicycle. They are believed to be irrelevant to the present invention.

SUMMARY OF THE INVENTION

A carrier embodying the invention can be provided in a number of sizes and configurations. Such a carrier comprises a sheath member of rigid or semi-rigid material, such as suitable plastic. The sheath member has an open end to receive an edged hand tool, a solid closed end, and a body portion therebetween. Intermediate the ends of the sheath member the body portion has an external groove therearound, and the carrier further comprises means for affixing the sheath member to an inclined tubular member of the handle assembly of a lawn mower or other mobile lawn or garden appliance, with the open end higher than the closed end. The affixing means includes a metal band seated in the groove and a clamping member attached to the metal band and having confronting jaws for clamping engagement with the inclined member.

DESCRIPTION OF THE DRAWING

FIG. 1 is a side view of a carrier that is a first preferred embodiment of the invention affixed to an inclined tubular member of the handle assembly of a lawn mower, the tubular member being shown fragmentarily;

FIG. 2 is an enlarged view on line 2—2 of FIG. 1, showing the carrier alone, this view being a top view of the carrier of FIG. 1;

FIG. 3 is a view on line 3—3 of FIG. 2;

FIG. 4 is a view similar to FIG. 2 but showing a carrier that is a second preferred embodiment of the invention;

FIG. 5 is a view similar to FIG. 2 but showing the sheath of FIG. 2 by itself and partly broken away; and FIG. 6 is a view similar to FIG. 2 but with the band partly broken away.

DESCRIPTION OF THE INVENTION

FIGS. 1, 2 and 3 show a carrier 10 that is a first preferred embodiment of the invention. Carrier 10, which is suitable for carrying pruning shears (not shown), comprises a sheath member 12 of rigid or semi-rigid material that may be plastic, of which one of many suitable examples is polyethylene. Other suitable materials for sheath member 12 include metal and wood. Sheath member 12 has an open end 14 (best seen in FIG. 3) to receive an edged hand tool (not shown), a solid closed end or tip 16 with an external tapered configuration and a body portion 18 having a wall 20 defining a rectangle (best seen in FIG. 3) between open end 14 and closed end 16. Wall 20 need not be rectangular but may alternatively have a circular, oval, triangular or other suitable configuration.

Carrier 10 further comprises means indicated generally at 22 in FIG. 1 for affixing sheath member 12 to an inclined tubular member 24 of the handle assembly of a mobile lawn and garden appliance, such as particularly a lawn mower, with open end 14 higher than closed end 16.

Affixing means 22 comprises a sharp-sided groove 26 (FIGS. 2, 5 and 6) extending around the exterior of body portion 18 of sheath member 12 about half way between ends 14 and 16 and a metal band 28 seated in and confined by the sides of groove 26 (FIGS. 2 and 6) and extending therearound, and a clamping member 30 of resilient material having confronting concave jaws 34 with spaced jaw extensions 36 remote from band 28. Jaws 34 are attached to metal band 28 which is secured to sheath member 12 by a rivet 38 passing through metal band 28 and wall 20 of body portion 18, at a location about half way between the short sides of the rectangle. The ends of jaws 34 adjacent band 28 are spaced apart as indicated at 32 in FIG. 3. Jaw extensions 36 are provided with aligned holes therethrough for receipt of the shank of a carriage or shoulder bolt, the head of which is shown at 40 in FIG. 1, whereby, in cooperation with a wing nut and a lock washer (not shown) clamping force is applied to jaw extensions 36 to secure jaws 34 of clamping member 30 to tubular member 24.

By virtue of the resilient nature of clamping member 30, jaw extensions 36 and jaws 34 can be spread sufficiently to receive tubular member 24 between jaws 34.

As stated, carrier 10 is suitable for carrying pruning shears therein. To that end, the rectangle defined by wall 20 may be about 1 inch (2.54 cm) by 2 inches (5.08 cm), the length of sheath member 12 may be about 5.5 inches (14.0 cm) and the longitudinal dimension of tapered closed end or tip 16 may be about 0.5 inch (1.27 cm).

FIG. 4 is a view similar to FIG. 2 but showing a carrier 42 that is a second preferred embodiment of the invention. Carrier 42, which is suitable for carrying hedge clippers (not shown), is of necessity longer than carrier 10, but is otherwise similar to carrier 10. Thus, carrier 42 comprises a sheath member 44 having an open end 46, a solid closed end or tip 48 with an external tapered configuration and a body portion 50 having a wall 52 defining a rectangle between open end 46 and closed end 48. Sheath member 44 is of rigid or semi-rigid material that may be plastic, of which one of many suitable examples is polyethylene. Other suitable materials for sheath member 44 include metal and wood. Wall 52 need not be rectangular but may alternatively have a circular, oval, triangular or other suitable configuration.

Carrier 42 further comprises means indicated generally at 54 for affixing sheath member 44 to an inclined tubular member such as tubular member 24 with open end 46 higher than closed end 48. Means 54 includes two sharp-sided grooves 56 extending around the exterior of body portion 50 of sheath member 44, grooves 56 being longitudinally spaced from each other, and a metal band 58 seated in and confined by the sides of each groove 56 and extending therearound. Grooves 56 and metal bands 58 are in all respects the same as groove 26 and metal band 28, respectively, and a clamping member (not shown) that is in all respects the same as clamping member 30 is associated with each metal band 58 and is attached thereto and to sheath member 44 in the same manner in which clamping member 30 is attached to metal band 28 and sheath member 12 with the jaws and the jaw extensions of the two clamping bands of carrier 42 aligned with each other.

The length of sheath member 44 may be about 10 inches (25.4 cm) and the rectangle defined by wall 52 may be about 1 inch (2.54 cm) by 2 inches (5.08 cm) and the longitudinal dimension of tapered closed end or tip 48 may be about 1 inch (2.54 cm).

Wall 52 has aligned slots 60 in communication with open end 46 to accommodate a bolt of hedge clippers. Slots 60 are in the larger sides of the rectangle defined by wall 52.

Solids ends 16 and 48 provide resistance to puncture by edged hand tools carried by carrier 10 or carrier 42.

The affixing means could assume other forms than affixing means 22 and 54. For example, velcro strips or plastic or cloth straps with buckles or snaps or other adjustable locking devices could be used for this purpose.

The invention well attains the stated objects and advantages and others.

The disclosed details are exemplary only and are not to be taken as limitations on the invention except as those details are included in the appended claims.

What is claimed is:

1. A carrier comprising a sheath member having an open end to receive an edged hand tool, a solid closed end and a body portion providing a wall extending therebetween, and means for affixing said sheath member to an inclined tubular member of a handle assembly of a mobile lawn and garden appliance with said open end higher than said closed end, wherein said affixing means comprises at least a first groove extending around the exterior of said body portion of said sheath member intermediate said ends, at least a first metal band seated in said first groove and at least a first clamping member attached to said first band and having confronting jaws for clamping engagement with the tubular member.

2. A carrier according to claim 1 wherein said first metal band is secured to said sheath member by a rivet passing through said first metal band and said wall of said body portion of said sheath member.

3. A carrier according to claim 1 wherein said affixing means further comprises a second groove extending around the exterior of said body portion of said sheath member intermediate said ends at a location spaced from said first groove, a second metal band seated in said second groove, and a second clamping member attached to said second band and having confronting jaws for clamping engagement with the tubular member.

4. A carrier according to claim 1 wherein said sheath member is of plastic material.

5. A carrier according to claim 4 wherein said material is polypropylene.

6. A carrier according to claim 1 wherein said sheath wall has aligned slots in communication with said open end.

7. A carrier according to claim 1 wherein said solid closed end has an external tapered configuration.

* * * * *